LOUD-SPEAKING TELEPHONE SET

Filed Aug. 11, 1948 2 Sheets-Sheet 1

INVENTOR
R. K. POTTER
BY N. S. Ewing
ATTORNEY

LOUD-SPEAKING TELEPHONE SET

Filed Aug. 11, 1948 2 Sheets-Sheet 2

INVENTOR
R. K. POTTER
BY N. S. Ewing
ATTORNEY

UNITED STATES PATENT OFFICE 2,568,823

LOUD-SPEAKING TELEPHONE SET

Ralph K. Potter, Morristown, N. J., assignor to Bell Telephone Laboratories, Incorporated, New York, N. Y., a corporation of New York Application August 11, 1948, Serial No. 43,623

5 Claims. (Cl. 179—1)

This invention relates in general to signal transmission and reception in communication systems, and more particularly to the transmission and reception of audio signals through free space at a telephone terminal.

In accordance with conventional telephone practice, a participant in a telephone conversation transmits and receives speech signals through a pair of instruments connected by cord to the telephone line and held closely adjacent the mouth and ear. Such a system has obvious disadvantages, particularly for those whose work necessitates moving about and performing manual operations during the conversation, in that it confines the participant within a small area and burdens him with either a telephone handset or headset. In order to overcome these disadvantages, it is desirable to provide a system in which the received speech signals may be beamed or radiated to listeners within a relatively wide area adjacent a fixed terminal installation, and in which outgoing signals are spoken into a microphone having high amplification and receptivity over a broad angle.

However, in a system of this second type, several inherent disadvantages arise such as exposure of conversation from a distant speaker, and tendency of the system to produce a singing or humming noise because of the high amplification and energy feedback from receiver to transmitter.

A broad object of the present invention is to provide for an improved type of signal transmission and reception at the terminals of an electrical communication system. A more specific object of the present invention is to facilitate the transmission and reception of speech signals at locations substantially removed from a telephone terminal instrument.

In accordance with an embodiment of the present invention, speech signals received over the telephone line are impressed as modulations on an inaudible carrier wave which is generated at the telephone terminal and radiated to the adjacent area through free space. The speech signals are detected and demodulated by means of a passive detecting element mounted in the ear of a listener who may be at any point within the radiated area. Return signals are spoken into a microphone having high amplification and broad angle receptivity, which is attached to the telephone terminal fixture.

A particular feature of systems in accordance with this invention is that hum or singing arising from the feedback of energy between the telephone receiver and transmitter is largely eliminated because of the different characters of the waves transmitted and received by the telephone terminal instrument.

Another important feature of this invention is that it provides for an increased area of reception for telephone signals from the terminal instrument without the disadvantage of exposing the conversation of a distant speaker to causal listeners.

More particularly, in the embodiment of the invention disclosed, signals received at the terminal are radiated on an ultrasonic carrier to a listener, who is provided with an ultrasonic capsule detector mounted to fit directly into the ear canal. The capsule is free from external wires and attachments, being driven by the force of the received ultrasonic waves. Several alternative types of ultrasonic detectors are disclosed.

Additional objects and features of the present invention will be apparent from a study of the detailed specification and claims hereinafter and the attached drawings of which:

Figs. 3A, 3B and 3C are diagrams of wave forms described in connection with the operation of the system of Fig. 2;

Figure 1:
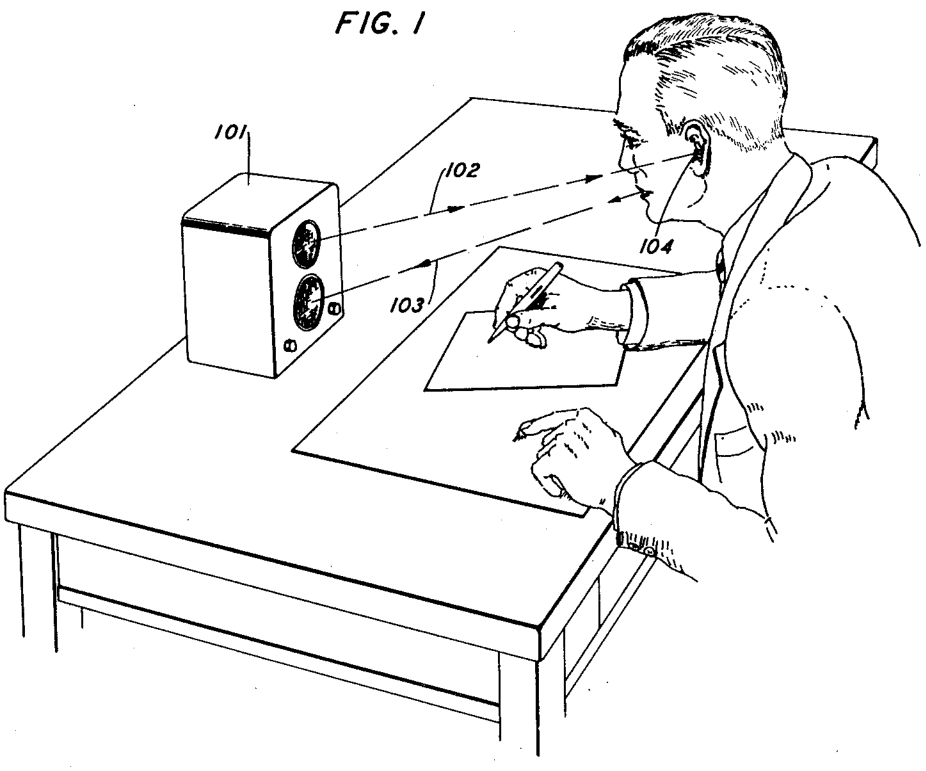
Fig. 1 shows in perspective a system in accordance with the present invention in which signals are radiated from the telephone terminal set in the form of audio modulated carrier waves, and return signals are spoken into a microphone at a substantial distance from the set.

Referring to Fig. 1 of the drawings, the telephone terminal set 101, which is connected to conventional incoming and outgoing telephone lines, is designed to transmit a beam of carrier waves 102 modulated in accordance with received speech signals, in the direction of a telephone subscriber, who is equipped with a capsule detector unit 104. The detector 104 is constructed to recover the speech signals from the modulated carrier. The detector unit 104 is adapted to fit into the ear canal of the listener and is operated primarily through power derived from the received waves, having no external source of power or wire attachments. Return speech signals 103 which may be directed toward the telephone set 101 by the speaker from a position substantially removed therefrom, are greatly amplified before being impressed on the outgoing telephone circuit. The telephone transmitter should be of such design as to respond only to audio waves and to be unresponsive to waves of the radiated carrier.

It is apparent that the teachings of the present invention may be applied to systems of many types other than the specific embodiments to be described hereinafter with reference to attached drawings for the purpose of illustration.

A schematic diagram of a system in accordance with the invention including means for generating and radiating an ultrasonic carrier for incoming signals received over the telephone line will be described in detail with reference to Fig. 2. In accordance with the system shown, incoming signals from the telephone line which are radiated from the terminal apparatus as modulations impressed on an ultrasonic carrier beam, are directed toward a given listener who detects the signals by means of a small ultrasonic capsule detector inserted in the ear. Incoming signals are thus inaudible except to persons equipped with some means of ultrasonic detection. Outgoing speech signals from the mouth of a speaker are picked up by the microphone shown and transmitted to the telephone line indicated at the left of Fig. 2.

Figure 2:
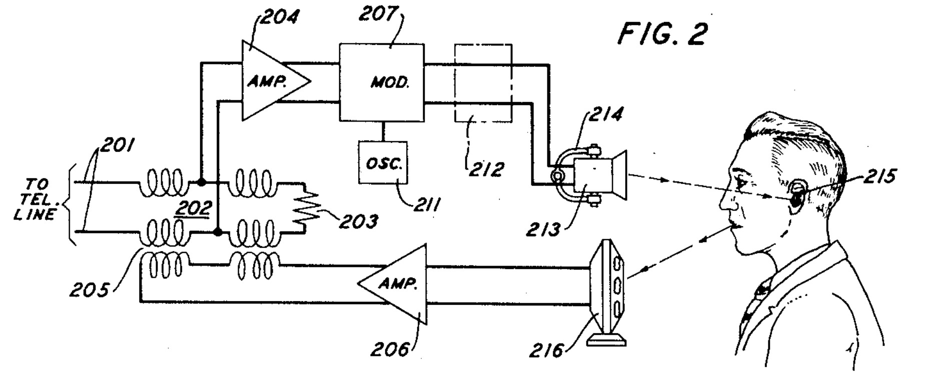
Fig. 2 shows a schematic diagram of a system in accordance with the present invention in which an ultrasonic carrier wave is utilized for radiating received audio signals to the listener.

Referring to Fig. 2, assume that an incoming telephone signal having a frequency range from 0.2 to 3 kilocycles is received from the telephone line 201 at the left by the hybrid coil 202. Ideally, the hybrid coil 202, which is of a conventional type used in electrical transmission systems is terminated in a balancing impedance 203, which is substantially matched to the line impedance as will be described hereinafter. A fraction, for example, ½ of the signal power, goes to the input of one-way amplifier 204 through direct connection while the remainder passes through the transformer coupling 205 and is dissipated in the output of the one-way amplifier 206. Except for a small loss in the transformer coupling 205, this ideal energy division holds, providing the amplifiers 205 and 206 are designed to have impedances which balance each other, a condition ordinarily closely approximated. The transformer coupling 205 of the hybrid coil 202 usually closely approximates ideal transformer operation over most of the audio range of frequencies from 200 to 3000 cycles. The amplifier 204 may be assumed to be an ordinary audio amplifier with a maximum output of perhaps 1 watt. The modulator 207 is directly connected to the output terminals of the amplifier 204, the received output signal serving as a modulating signal for the modulator. This modulating signal is impressed on an ultrasonic carrier wave of perhaps 2 watts at 30 kilocycles which is derived from the oscillator 211, which may be a conventional vacuum tube oscillator or a quartz or a magnetostrictive oscillator, or alternatively, a siren type or any other of the types well known in the art which produce the desired output at the desired frequency. Preferably, the modulator 207 is assumed to be a second order type such as shown and described in Transactions of the A. I. E. E. volume 58, page 253, by R. S. Carruthers, and having an output which includes two sidebands, the lower in the range 27 to 30 kilocycles and the upper in the range 30 to 33 kilocycles along with the carrier at 30 kilocycles. A conventional type filter 212 may be connected across the output of the modulator 207 indicated by the dotted lines, for the purpose of cutting out unwanted frequency components. Alternatively, the audio amplifier 204 may be designed to have a lower output which would be combined with a correspondingly lower output of the oscillator 211 in the modulator 207, the modulated signal being again amplified in an additional amplifier which could be inserted in the circuit to follow the filter 212. Moreover, alternatively to use of the filter 212, the modulator 207 may assume the form of a balanced modulator which cuts out the direct transmission of the modulating signal together with the other unwanted frequencies at sufficiently low levels so as not to require filtering.

The resultant output from the modulator 207 is thus limited to the carrier and two sidebands. Utilizing the type of modulating circuit described, the output assumes the form of a carrier frequency of variable amplitude with the envelope in the shape of the signal as indicated in Fig. 3C, typical signal and carrier waves being indicated in Figs. 3A and 3B, respectively. To hold down distortion in such a modulator, the carrier must be greater than the strongest modulating signal by 3 decibels or so. Assume the modulated output has a power of the order of 1 watt. The output of the modulator 207 is then applied to a loud speaker 213 designed for the ultrasonic range. The loud speaker 213 may comprise an electrical driving coil in a magnetic or electromagnetic circuit such as discussed by Olson in "Elements of Acoustical Engineering," second edition, Van Nostrand, 1947, pages 522–523 or may have a driving transducer of another well-known type such as a magnetostrictive rod or a piezoelectric crystal. In general, the ultrasonic loud speaker 213 should be of such design as to beam the output, confining most of the energy to a limited solid angle so that the listener equipped with an ultrasonic detecting capsule 215, which will be described in detail hereinafter, must be in the beam to receive the maximum response.

The ultrasonic loud speaker 213 is preferably mounted in a yoke 214 in such a manner as to be rotatable about either a horizontal or vertical axis, whereby the beam may be directed toward listeners in different positions over a wide area adjacent the telephone terminal fixture in much the same manner as a beam of light or of high frequency radio waves is projected. Alternatively, the ultrasonic loud speaker 213 may be designed to have a wide angle of directivity, whereby a wide area can be served from one position. Such an arrangement, however, is less efficient than use of a directed beam, as described above.

For outgoing transmission, speech is picked up from the talker by a microphone 216, such as shown and described in The Radio Amateur's Handbook, 1948 edition, pages 282–4, and which has a response characteristic such that it is sensitive to waves having frequencies within the audio range, but is insensitive to waves within the frequency range of the ultrasonic carrier waves. The output of the microphone 216 is amplified to normal telephone level by the conventional one-way amplifier 206, the output of which is fed to the hybrid coil 202 through the coupling 205. To the extent that the balancing impedance 203 matches the telephone line 201 at the left, the energy will divide equally between the impedance 203 and the telephone line 201. As it is not feasible to match the impedance 203 to the telephone line impedance perfectly at all frequencies, there will be a flow of unbalanced power to amplifier 204. As this goes through the modulator 207 and ultrasonic loud speaker 213 to the talker, it produces some sidetone which serves a useful purpose so long as it does not become excessive, a condition which is readily prevented by the balance at the hybrid coil 202.

The capsule detector 215, which functions to demodulate the ultrasonic carrier beam from the ultrasonic loud speaker 213 and recover the impressed signal, may assume numerous forms, one of which will now be described in detail with reference to Fig. 4 of the drawing.

Figures 3, 4A, 4B, 5A, 5B, 5C, 5D, 5E, 6A, 6B, 6C, 6D:
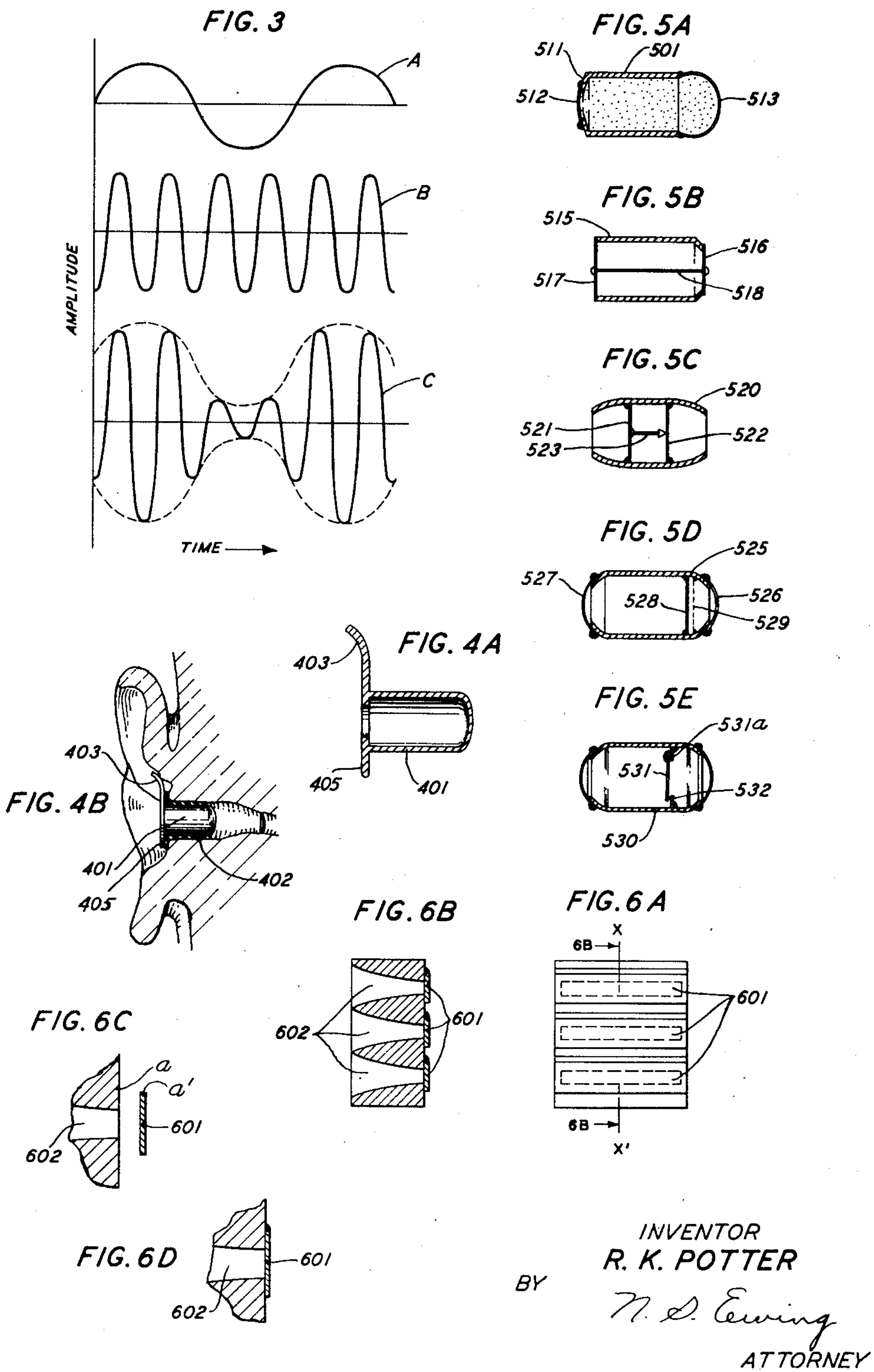
Fig. 4A shows in detail a form of ultrasonic detector element.
Fig. 4B shows a capsule such as 215 of Fig. 2 including the detector element 4A which is adapted to fit into ear of a listener.
Figs. 5A–5E show alternative forms of detector units which may be substituted for the detector of Fig. 4A in the capsule of Fig. 4B.
Figs. 6A–6D show in detail a preferred form of multiflap valve ultrasonic detector unit which may be in the ultrasonic capsule detector of Fig. 4B.

The capsule detector shown in Fig. 4 comprises a principal detector element indicated in Fig. 4A which is mounted in a fitting adapted for the ear canal indicated in Fig. 4B.

The detector element per se, which is shown in cross-section in Fig. 4A, comprises a metal shell of substantially cylindrical shape approximately 1¼ centimeters long, and having an inside radial dimension of approximately .4 centimeter, one end of which is closed with a slightly dome-shaped metal diaphragm, and the other end of which has a central opening having a radius of approximately .25 centimeter. The shell is preferably formed from a piece of sheet metal such as nickel silver, for example, approximately .017 centimeter thick, and having a compliance of about $3 \times 10^{-9}$ centimeters per dyne. The dome, which is shaped to permit easier motion in an (outward) direction than in an (inward) direction, is formed with a radius of curvature of approximately .6 centimeter. It is noted that metal strips of different response for forces applied in opposite directions are used for producing a click sound and for operating an electrical switch, in which the resistance to displacement increases as a function of the displacement until at some critical point the resistance to displacement disappears entirely and the metal displaces itself, suddenly of its own accord, by a relatively large amount, usually remaining, in the case of these devices, in the changed position until it is restored to its original shape by external force.

In Fig. 4B is shown a capsule including the detector of Fig. 4A mounted in the ear canal with the features added suitable for operation therein. The assemblage comprises a covering 402 for the outside surface of the metal shell 401 shaped to fit the ear canal. The covering comprises a material such as, for example, felt, having a thickness of the order of .05 centimeter, which is soft, so as not to feel uncomfortable, and heat insulating, so that the cold metal is not felt by the ear. There is also provided a metal flap 403, also felt-covered, which is rigidly attached to the end of the shell adjacent the opening for inserting the capsule in the ear canal and an enlarged section to prevent the inner end of the capsule going beyond the intended position at the opening of the ear canal. This is formed by a ring-shaped metal flange 405 attached to one end of the shell 401.

Several alternative forms of ultrasonic detector units which can be substituted for the element shown in Fig. 4A of the drawings, are shown in Figs. 5A to 5E of the drawings.

Fig. 5A shows a device which acts as a non-linear rectifier of ultrasonic carrier waves, comprising a shell 501 preferably about 1 centimeter long, and with a radial dimension of about .4 centimeter which is formed from sheet metal or plastic having a thickness of the order of about .04 centimeter. One of the ends 511 of the cylindrical shell 501 is closed except for a central hole having an approximate radius of about .3 centimeter, which is covered by a small diaphragm 512 of thin metal or similar material. At the other end of the cylinder a much larger diaphragm 513 comprising some material such as rubber, is distended outwardly to a bulbous shape by an enclosed gas such as nitrogen which is preferably maintained at an excess pressure of about .01 atmosphere. This expedient produces an unbalanced pressure on the two sides of the diaphragm 513 so that the stiffness differs for the two directions of transmission.

Fig. 5B shows a device for linear rectification of ultrasonic waves which comprises a shell 515 of metal, plastic or similar material having similar dimensions to the shell 501 in the device of Fig. 5A, enclosed at the ends with diaphragms 516 and 517 comprising nickel silver or similar material. The diaphragms 516 and 517 are connected by a light silken thread 518 knotted at both ends on the exterior of the diaphragms. The thread 518 should be maintained at such a tension that as the diaphragm 517 moves toward the right, it does not displace the diaphragm 516; but as the diaphragm 517 moves to the left, the thread 518 becomes sufficiently tight to pull the diaphragm 516 with it. Thus, ideal transmission occurs only during the positive half of the cycle, producing half-wave rectification.

Fig. 5C shows a linear ultrasonic detector comprising an open-ended shell 520 such as the shell 515 described above in which are mounted a pair of diaphragms 521 and 522 in spaced parallel relation. The diaphragm 521 is tuned to ultrasonic frequencies and the diaphragm 522 is tuned to audio frequencies. A small metal nib 523 is mounted inwardly from the central portion of the diaphragm 521 so that it barely makes contact with the diaphragm 522, thereby moving the diaphragm 521 to the right during the positive half-wave of displacement and leaving it stationary during the negative half, whereby half-wave rectification is produced.

Fig. 5D is an ultrasonic detecting device comprising a shell 525 of aluminum, plastic, or similar material, which is closed at the ends with protective silk membranes 527 and 526. A metal or plastic diaphragm 528 mounted near one end of the shell separates the interior into two cavities, one being made efficient for the reception of signal components in the ultrasonic carrier frequency range and the other being made efficient at audio frequencies. A grid 529 is mounted adjacent the diaphragm 528 in the direction of the audio cavity. The grid 529 which comprises a number of parallel wires held on the side away from the diaphragm by stiff supporting wires fastened at right angles to them permits the diaphragm 528 energized by received ultrasonic waves to move in one direction, but not in the other.

Fig. 5E shows a detecting device comprising a metal shell 530, such as described with reference to the foregoing figure, in which is mounted a flap valve 531. The flap valve comprises a membrane 531 of metal or plastic elastically supported at 531a on the inner side of the shell 530, so that it moves to and fro in the direction of waves passing through the shell. On the inner side of the shell 530 opposite the support 531a, is fixedly mounted a matching vane 532 positioned to overlap the hinged vane 531 thereby restricting its motion in a right-hand direction. The valve accordingly opens and closes in a left-hand direction in response to variations in pressure, thereby producing linear rectification of the modulated ultrasonic waves.

In detectors of the flap-valve type, such as disclosed in Fig. 5E, described in the preceding paragraph, and Figs. 6A–6D, which will presently be described, it is preferable that the felt covering of the unit be constructed in such a manner as to permit the circulation of the direct-current pressure component which is built up in the ear by the continuous one-way operation of the flap valve. This may be accomplished, for example, by providing an outwardly extending groove between the valve casing and the wall of the ear canal thus permitting the air pressure built up in the ear to be equalized without interfering with the operation of the flap valve. It is apparent that there are many other methods of providing for such pressure equalization.

The resonant element of an improved type of flap valve ultrasonic detector which operates with greater efficiency than the device disclosed in Fig. 5E is shown in detail in Figs. 6A to 6D. In accordance with this modification, the mechanical resonant element, which replaces the single flap valve 531—532 mounted in the shell 530 of Fig. 5E takes the form of metal strips deposited on a surface having a plurality of long, narrow openings, the surface being so prepared that the metal adheres in places to form supports permitting elastic opening and closing of the valve.

Fig. 6A shows an enlarged cross-sectional view .75 centimeter square of a portion of the resonant element which includes three long, narrow openings 602 in transverse parallel arrangement, as indicated by the dotted lines, each of which is covered by a corresponding metal strip 601 fastened at one side to form a support.

Fig. 6B shows a section along the line XX′ of Fig. 6A perpendicular to the front end of the strips 601, which are fastened at the top over the channels 602, and closed at the bottom but not fastened.

Fig. 6C shows a greatly enlarged end view of a valve opening 602 and a valve flap 601 before they are fastened as in Fig. 6D. The metal base in which the tapered channels 602 are formed is approximately .5 centimeter thick, and may be nickel, as may also be the valve flaps 601. All the surfaces are finished smooth, then chromium plated except for sufaces $a$ and $a'$ which are unplated. Chromium is preferable for the purpose of plating because it is not affected by the heating necessary to join the nickel to it. The nickel is preferable for the base material because it is relatively inert, particularly if no acids are used in the joining process. The strip is held firmly in position, and soldered or brazed so as to join surfaces $a$ and $a'$. In order to keep the surfaces smooth and clean, resin rather than acid soldering is preferably employed. The stubby nature of the valve gives it a high resonant frequency, preferably above the 30-kilocycle ultrasonic frequency assumed. The resonant frequency of the valve flap is directly proportional to the thickness of the rectangular strips 602 and inversely proportional to the square of the width. While the resonant frequency is increased much more rapidly by shortening the width of the strip, if the dimensions become too small it is apparent that the material will be difficult to work with. If, on the other hand, the thickness becomes too great, it will be difficult to obtain sufficient opening of the valve. Some approximate figures are shown on the drawing to indicate the order of magnitude which is satisfactory.

An ultrasonic wave from the left in Fig. 6B travels through the channels 602 to the valve strips which open during that half of the cycle in which the pressure is increased over atmospheric but which close when this excess pressure ceases, remaining closed during the half cycle in which the pressure is reduced below atmospheric, thus giving half-wave rectification. As the capsule including the resonant element fits into the ear canal, an air space such as a groove must be left between the ear canal and the capsule to provide for the direct-current flow of air resulting from the rectification. A sufficient number of valve slits 602 must be provided so that the phase of the ultrasonic wave over the areas where similar action is to take place must not be greatly different, preferably under 90 degrees, which at 30 kilocycles, means under about .3 centimeter for the most critical direction, namely, perpendicular to the wave front.

As explained, the parts of Fig. 6 show only the mechanical resonant element, arrangements for fitting the ear having been previously shown in Fig. 4.

It is apparent that within the scope of the present invention, there are many variations and modified forms of ultrasonic detector units in addition to the types shown and described.

What is claimed is:

1. A loudspeaking telephone set comprising in combination a two-way subscriber's line having a pair of branches simultaneously coupled to said line, amplifying means included in said branches, a source of carrier wave energy, means included in one of said branches for modulating the carrier wave energy of said source in accordance with message signals received over said subscriber's line, a projector continuously coupled to receive the output of said modulator and to radiate said carrier waves over a selected area, a detector located within said area and responsive to demodulate the modulated carrier waves radiated from said projector to derive said message signals therefrom, a telephone transmitter continuously coupled to the other of said branches for impressing return message signals on said subscriber's line, wherein said transmitter is positioned to be actuated by the carrier waves radiated by said projector, but wherein the branch including said transmitter has a response characteristic which includes the frequency band of said message signals but excludes the frequency band of said carrier waves.

2. A loudspeaking telephone set comprising in combination a two-way subscriber's line having a pair of branches simultaneously coupled to said line, amplifying means included in said branches, a source of ultra-sonic vibrations, means included in one of said branches for modulating said ultra-sonic vibrations in accordance with message signals received over said subscriber's line, an electroacoustic projector continuously coupled to receive the output of said modulator and to radiate the modulated ultra-sonic waves comprising said output over a preselected area, an ultra-sonic detector disposed in said area for demodulating said modulated ultra-sonic waves to derive said message signals therefrom, a telephone transmitter continuously coupled to the other of said branches for impressing return message signals on said subscriber's line, wherein said transmitter is positioned to be actuated by the ultra-sonic waves radiated by said source, but wherein the branch including said transmitter has a response characteristic which includes the frequency band of said message signals but excludes the frequency band of said ultra-sonic vibrations.

3. A loudspeaking telephone set which comprises in combination a two-way telephone subscriber's line, a receiving circuit responsive to telephone message signals received over said line, said receiving circuit including a source of carrier waves modulated in accordance with message signals received over said line, a projector continuously connected in series with said receiving circuit for radiating the modulated carrier waves of said source over a preselected area adjacent said projector, a detector located at a position within said area, said detector disconnected from said telephone system and operated primarily in response to power derived from said modulated carrier waves to recover said received message signals therefrom, a telephone transmitter to impress return message signals on said telephone system, wherein said telephone transmitter is positioned to be actuated by the carrier waves radiated by said projector, and a connecting circuit for simultaneously connecting said telephone transmitter and said receiving circuit to said two-way subscriber's line, amplifying means included in said connecting circuit, the combination including said connecting circuit, said telephone transmitter, and said receiving circuit presenting a relatively high loss to said carrier waves.

4. A loudspeaking telephone set comprising in combination a two-way telephone subscriber's line, a transforming device having first and second terminals in conjugate relation and a third terminal electrically coupled to said first and second terminals, the third terminal of said transforming device connected to said line, a first circuit branch connected to said first terminal of said transforming device, said branch comprising an amplifier, a modulator, and a carrier wave projector all continuously connected in series relationship, a source of carrier waves, said modulator connected to modulate the carrier waves of said source in accordance with message signals received over said subscriber's line, said projector disposed to radiate the modulated carrier wave output received from said modulator over a preselected area, a detector located within said area and operative primarily in response to power derived from said modulated carrier waves to recover said received message signals therefrom, a second circuit branch continuously coupled to said second terminal of said transforming device, said second branch comprising an amplifier and a telephone transmitter connected in continuous series relationship, wherein said telephone transmitter is disposed in the said area to be actuated by the carrier waves radiated by said projector, but wherein said transmitter has a response characteristic which includes the frequency band of said message signals but excludes the frequency band of said carrier waves.

5. A system in accordance with claim 4 in which a filter is interposed in said first branch across the output of said modulator.

RALPH K. POTTER.

REFERENCES CITED

The following references are of record in the file of this patent:

UNITED STATES PATENTS

| Number | Name | Date |
|---|---|---|
| 544,732 | Lakin | Aug. 20, 1895 |
| 580,872 | Lakin | Apr. 20, 1897 |
| 837,196 | Coulter | Nov. 27, 1906 |
| 1,683,316 | Suchorzynski | Sept. 4, 1928 |
| 1,828,151 | Neft | Oct. 20, 1931 |
| 2,157,140 | Molin et al. | May 9, 1939 |
| 2,277,907 | Goodale et al. | Mar. 31, 1942 |
| 2,343,115 | Noble | Feb. 29, 1944 |
| 2,461,344 | Olson | Feb. 8, 1949 |
| 2,495,426 | Schwartzberg | Jan. 24, 1950 |